United States Patent

Jacobs

[15] 3,702,402

[45] Nov. 7, 1972

[54] METHOD AND APPARATUS FOR LIGHT DETECTOR FABRICATION WITHOUT BRAZING

[72] Inventor: David F. Jacobs, Bethel Park, Pa.

[73] Assignee: Westinghouse Electric Corporation, Pittsburgh, Pa.

[22] Filed: March 2, 1971

[21] Appl. No.: 120,348

Related U.S. Application Data

[63] Continuation of Ser. No. 807,747, March 17, 1969, abandoned.

[52] U.S. Cl. ....................................250/216, 250/239

[51] Int. Cl. ..............................................H01j 39/12

[58] Field of Search ......250/239, 83.3 UV, 211, 216; 356/51

[56] References Cited

UNITED STATES PATENTS

| | | | |
|---|---|---|---|
| 1,948,766 | 2/1934 | Lyon | 250/239 X |
| 2,975,335 | 3/1961 | Harris | 250/239 X |
| 3,062,958 | 11/1962 | Warner | 250/83.3 UV |
| 3,185,846 | 5/1965 | Gilbert et al. | 250/83.3 UV |
| 3,504,181 | 3/1970 | Chang et al. | 250/83.3 UV |

*Primary Examiner*—James W. Lawrence
*Assistant Examiner*—T. N. Grigsby
*Attorney*—F. H. Henson, C. F. Renz and M. P. Lynch

[57] ABSTRACT

This invention is a light detector assembly utilizing components maintained in operational relationship by compression assembly and without the use of mechanical bonding.

2 Claims, 5 Drawing Figures

WITNESSES
Wm. B. Sellers
James F. Young

INVENTOR
David F. Jacobs
BY Michael P. Lynch
ATTORNEY

METHOD AND APPARATUS FOR LIGHT DETECTOR FABRICATION WITHOUT BRAZING

This application is a continuation of Ser. No. 807,747, filed Mar. 17, 1969, now abandoned.

BACKGROUND OF THE INVENTION

1 Field of the Invention

This invention relates in general to light detector assemblies and more particularly to light detectors assembled under compression without the requirement for brazing or welding.

2. Description of the Prior Art

Conventional procedures for the assembly of light detectors especially those designed for high temperature operation, such as many ultraviolet light detectors, include many individual steps, each of which require careful handling in order to prevent damage to the various detector components.

The most critical steps include brazing of temperature sensitive components to provide required electrical and mechanical contact. The light sensitive crystals used in many conventional ultraviolet detectors are subjected to several brazing operations in order to attach electrical contacts to the surfaces of the crystals. The excessive alloying temperatures required to braze the contacts to the more popular crystal materials such as, silicon carbide, often severely damage the crystal resulting in a poor production yield of the detectors.

SUMMARY OF THE INVENTION

This invention provides unique detector components and a method of assembly of these components which eliminates the high temperature brazing steps encountered in the assembly of conventional light detectors.

The detector components are designed for compression assembly in a detector housing thereby reducing the multistage assembly technique customarily employed to a simple, room temperature assembly operation which completely eliminates heating of the detector components and the problems encountered therewith.

DESCRIPTION OF THE PREFERRED EMBODIMENT

Figure 1:
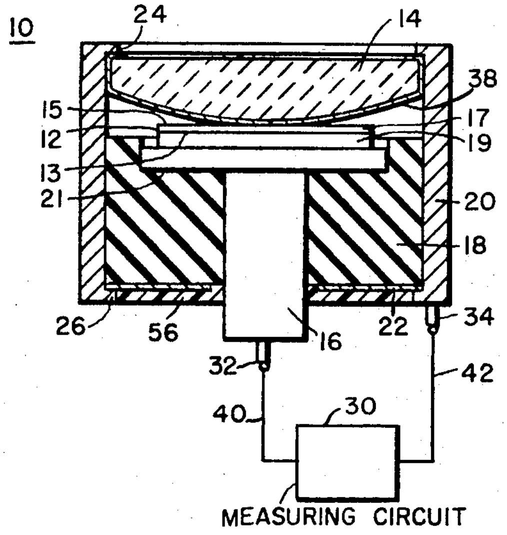
FIG. 1 is a sectioned schematic view of a preferred embodiment of the invention.

Referring to FIG. 1 there is illustrated a light detector 10, typically of the ultraviolet type, comprises essentially of a light sensitive crystal 12, a quartz light transmitting cover 14, an electrical conductor 16 and an electrical insulating sleeve 18 which are secured within an electrically conductive housing 20.

Housing 20 is a hollow tube which prior to assembly of the detector components includes an annular shoulder 24 at one end only. The components as illustrated in FIG. 1, starting with quartz cover 14, are inserted into housing 20 through the housing end without the annular shoulder. Following the insertion of the quartz cover 14, the crystal 12, the electrode 16 and the insulating sleeve 18 are inserted. The detector components having thus been inserted in the housing 20, they are maintained in mechanical contact by inserting an end plate 22 and securing the component assembly under compression by forming the annular housing shoulder 26. Shoulder 26 may be produced by deforming the end of the housing to reduce the inner diameter of the housing at this location, or it may be provided by mounting a retaining ring (not shown), the inner diameter of which is less than the inner diameter of housing 20, at the base of housing 20. The compression assembly of the detector components in this manner provides positive, reliable, physical contact between adjacent components without the requirement for welding, brazing or the application of various bonding materials.

A recessed shoulder 21 in insulating sleeve 18 is provided to maintain the crystal 12 and the electrode 16 centered within the housing 20.

The significance of this assembly technique is peculiarly apparent in the present ultraviolet detectors which often employ silicon carbide crystal light sensors. The silicon carbide crystal, in addition to being extremely sensitive to ultraviolet radiation, exhibits desired stability at temperatures far in excess of the temperature limits of other crystal sensors. This unique combination of high temperature stability and significant ultraviolet sensitivity makes the silicon carbide crystal extremely attractive as an ultraviolet sensor. The practical application of this crystal to use an an ultraviolet detector is not however without difficulties. The combination of silicon and carbon, which produces the silicon carbide crystal, produces a structure which is extremely difficult to secure in a detector assembly by welding and brazing techniques commonly utilized. The surface of the silicon carbide crystal is difficult to wet with brazing alloys commonly used and therefore the high temperatures required to alloy contact surfaces to the silicon carbide crystal in the conventional assembly procedure frequently results in the destruction of the crystal. Furthermore the inability to control the quality of contacts brazed to the silicon carbide crystal often results in contact failure.

The silicon carbide crystal 12 is a semiconductor diode consisting of a P-type region 17 and an N-type region 19. The diode characteristics are established by initially doping the silicon carbide with a suitable N-type donor material such as nitrogen and subsequently diffusing a second dopant of P-type material, such as aluminum or boron into the N-type crystal. The doping of the silicon carbide with the P-type material produces a semiconductor junction 13 between the P- and N-type regions. The depth of the PN-junction establishes the frequency sensitive range of the crystal. It is understood that equally acceptable results could be obtained if the silicon carbide were first doped with the P-type donor material and secondly with the N-type donor material.

The response of the crystal to light in the selected frequency range is analogous to that of a photovoltaic cell. Light energy transmitted through the quartz cover 14 and impinging on the surface of crystal 12 causes a flow of electrons across the semiconductor junction. The output level of current flow of the crystal 12 is a function of the intensity of the incident light and the current output range of the crystal is most significant at the predetermined light frequency. No external EMF is required. It is this feature which makes the crystal so convenient for most applications. The current flow established across the semiconductor junction 13 of crystal 12 is measured by the current responsive measuring circuit 30 of FIG. 1.

Electrical continuity between measuring circuit 30 and the crystal 12 is provided by electrodes 32 and 34 which are attached to the electrical conductor 16 and the electrically conductive housing 20 respectively. The direct electrical contact between the conductor 16 and the crystal 12 is accomplished by the compression assembly technique described above. The electrically conductive housing 20, which is electrically isolated from conductor 16 by the insulating sleeve 18 requires an electrical short circuit between the light sensitive surface 15 of wafer 12 and the housing 20 to establish measuring circuit continuity.

Figure 2:
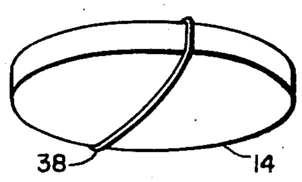
FIG. 2 is a perspective view of a quartz cover including an electrical conductor.

This circuit continuity is provided by applying an electrically conductive strip 38, as illustrated in FIGS. 1 and 2, to the convex surface of quartz cover 14 and extending the strip across the edges of the cover 14. The strip 38 may be secured mechanically to the quartz cover 14 or it may be deposited as a thin, narrow layer on the surface of the quartz cover thereby forming an integral part of the cover 14.

Figure 5:
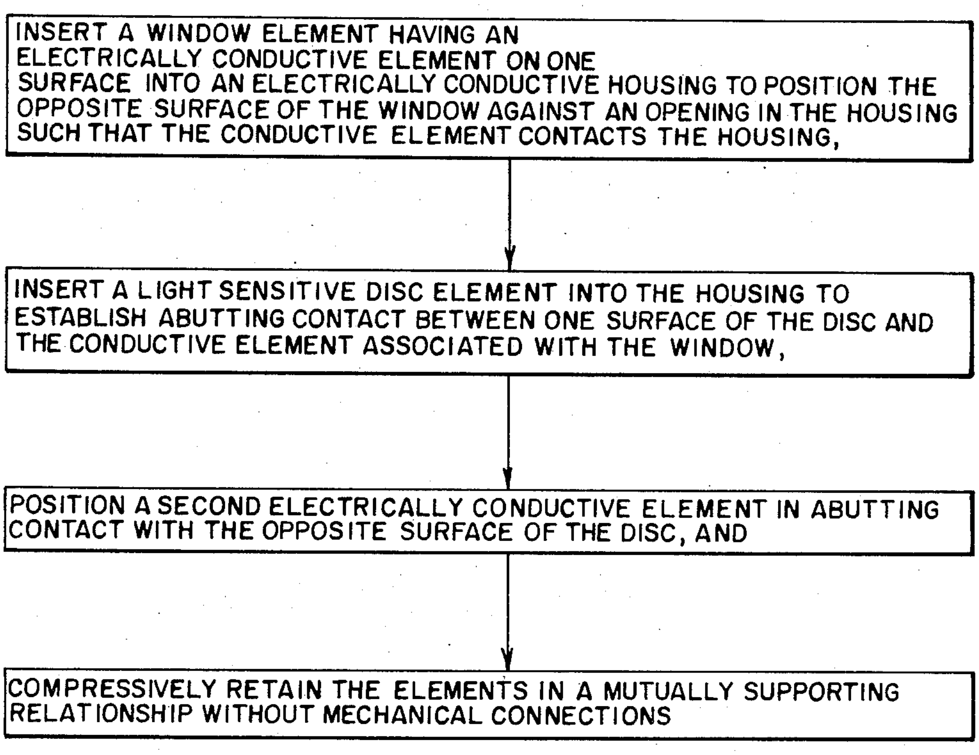
FIG. 5 is a flow chart illustrating the technique for assembling the device of FIG. 1.

The compression assembly of the detector components according to the procedure illustrated in the flow chart of FIG. 5 provides positive contact between the conducting strip 38 and the crystal 12 as well as establishing contact between the strip 36 and the conductive housing 20. The connection of the electrical cables 40 and 42 between the electrodes 32 and 34 and the measuring circuit 30 completes the detector measuring circuit.

The thickness of the crystal 12 is typically 25 mils with the light sensitive P-type region 17 being only several mils thick. The detector components illustrated in the drawing have been greatly enlarged for the purpose of clarity. In view of this minimum spacing and the compression assembly technique utilized in assembling the detector components a convex quartz cover surface has been provided for contacting the crystal tangentially thereby eliminating deformation of the conducting strip 38 at the edges of wafer 12 which deformation could result in an electrical short circuit between the P-type region 17 and the N-type region 19 across the edge of the junction 13.

Figure 3:
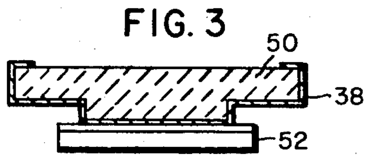
FIG. 3 is a sectioned view of a second quartz cover configuration.

While the convex quartz cover surface represents a preferred method of protecting against an electrical short circuit, the quartz cover 50 illustrated in FIG. 3 represents an alternate configuration. The cover surface in contact with the crystal 52 does not extend over the edges of the crystal and therefore protects against electrical short circuits across the semiconductor junction.

In order to prevent contamination of the detector components from unfavorable ambient conditions the sealant 56 is applied to the base of the detector housing 20. In addition to isolating the components from contaminants, the sealant 56 acts as an encapsulation material providing mechanical support for conductor 16 thereby eliminating crystal damage due to vibration of the conductor 16.

The compression assembly of the detector components heretofore described eliminates the hazards of brazing encountered in conventional detector assembly procedure and provides a simple, fast, trouble free assembly of the light detector. Furthermore the compression assembly technique minimizes the problems encountered in brazed assemblies resulting from dissimilar thermal expansion coefficients of the various components.

Figure 4:
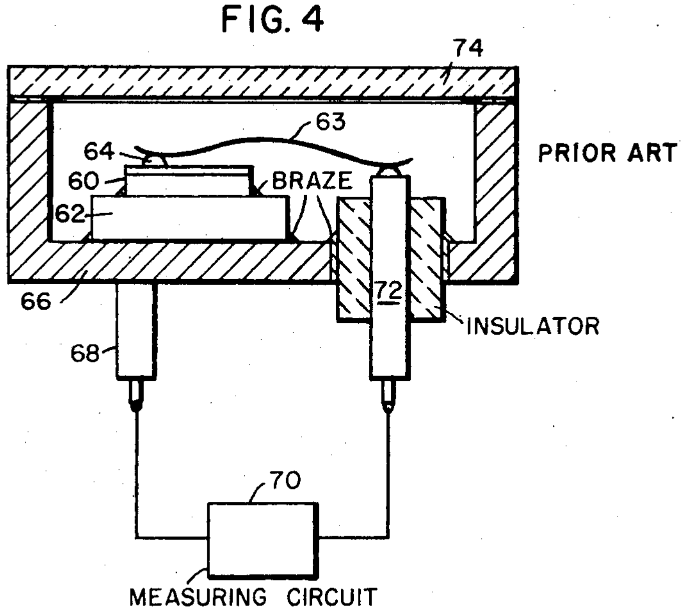
FIG. 4 is a sectioned schematic view of a conventional light detector identified as Prior Art.

The detector assembly technique illustrated in FIG. 4 and designated Prior Art illustrates the complex component assembly technique commonly utilized in the production of ultraviolet detectors.

The light sensitive crystal 60 is brazed under vacuum conditions to a small tungsten disc 62. The tungsten disc 62 compensates for thermal expansion characteristics of the silicon carbide crystal 60 and the housing 66. A gold contact bead 64 is then melted onto the light sensitive surface of crystal 60. The crystal and the disc are then brazed to the electrically conductive housing 66 which, through an integral conductor 68 is electrically connected to one input of a measuring circuit 70. A fragile electrical conductor 63 is then pressure bonded onto gold contact 64 and establishes electrical continuity between the second input of the measuring circuit 70 and the crystal 60 through an insulated feed-through electrical connector 72. A quartz cover 74 is then secured to transmit the light radiation to the sensitive surface of the crystal 60.

The numerous requirements for handling and heating of the crystal 60 in addition to the use of the fragile, vibration sensitive conductor 63 reduces the yield rate in the production of ultraviolet detectors by this conventional method to an unacceptable level.

While the present invention has been shown and described in a single embodiment it will be apparent that various modifications may be made without departing from its essential teachings.

What I claim is:

1. In a light responsive device for developing current signals as a function of the intensity and frequency of light energy impinging on a surface of a light sensitive crystal disc, the combination of a housing having an aperture in one end, a light transmitting window positioned in abutting contact with said end of said housing to transmit light entering said aperture to the interior of said housing, a first first conducting means supported on the surface of said window remote from said aperture and in abutting contact with said surface of said light sensitive crystal disc, said first current conducting means conducting said current signals developed by said light sensitive crystal disc, a second current conducting means electrically isolated from said first current conducting means and positioned in abutting contact with the opposite surface of said light sensitive crystal disc to conduct said current signals developed by said light sensitive crystal disc, and biasing means acting in compression to maintain abutting contact between said window and said housing, between said first current conducting means and said surface of said light sensitive crystal disc, and between said second current conducting means and said opposite surface of said light sensitive crystal disc.

2. In a light responsive device as claimed in claim 1 wherein said housing is constructed of electrically conductive material and said first current conducting means contacts said housing, said housing functioning as a current conducting member for said current signals.

* * * * *